H. B. NICHOLS.
WASHER FOR PHOTOGRAPHIC FILMS AND PRINTS.
APPLICATION FILED AUG. 5, 1914.
1,136,705.
Patented Apr. 20, 1915.
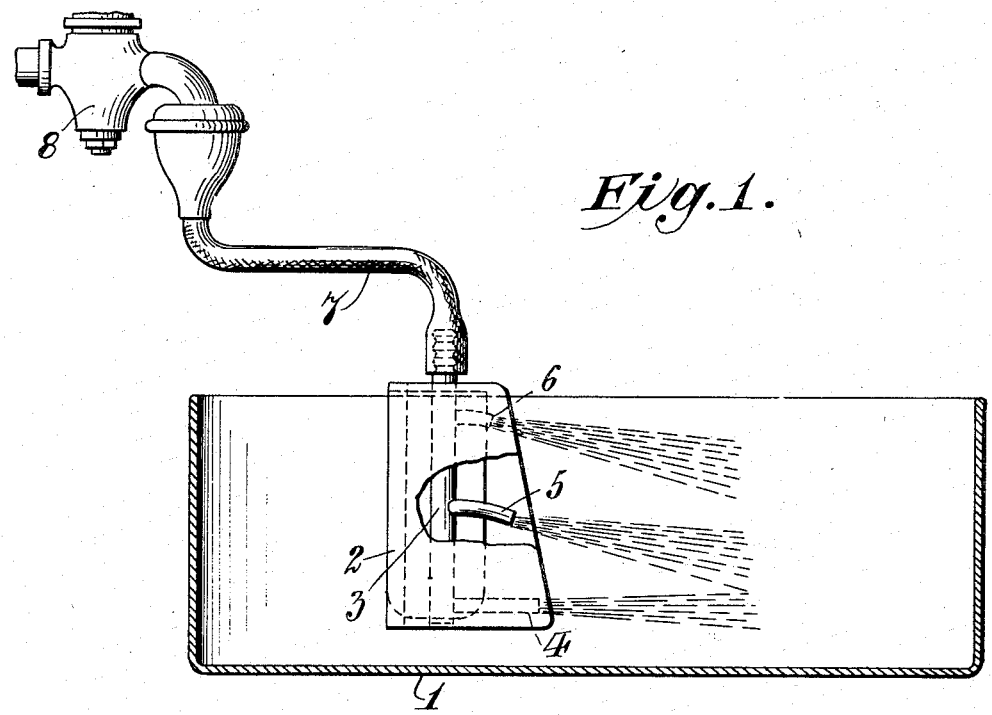
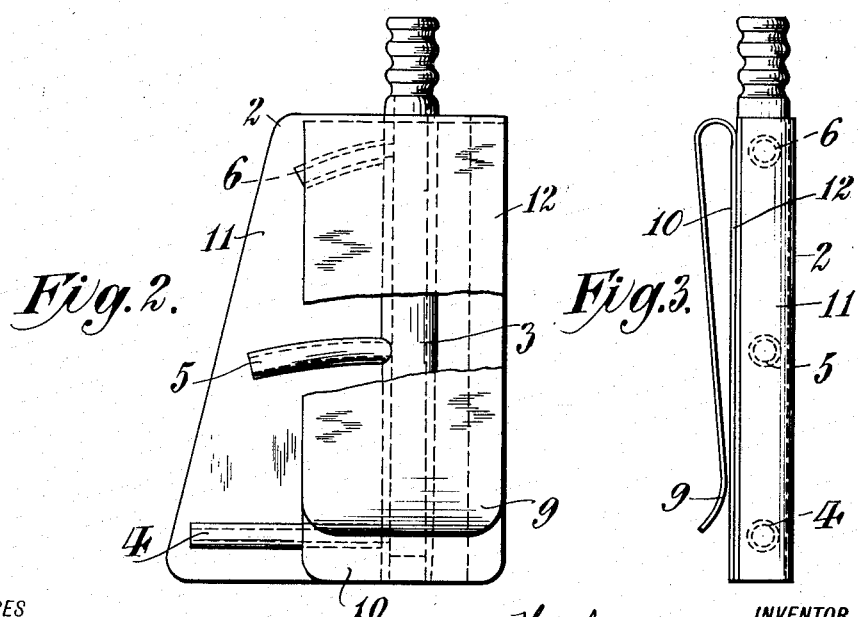
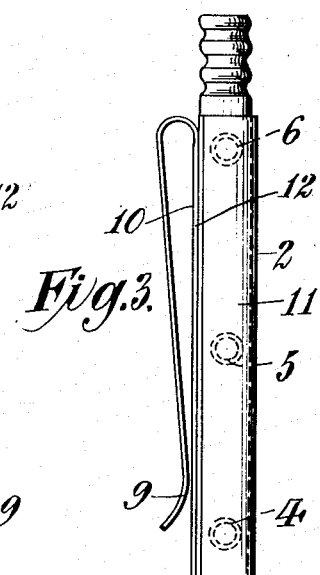
WITNESSES
INVENTOR
Herbert B. Nichols
BY
Redding, Greeley & Goodlett.
ATTORNEYS

UNITED STATES PATENT OFFICE.

HERBERT B. NICHOLS, OF SOUTH NORWALK, CONNECTICUT.

WASHER FOR PHOTOGRAPHIC FILMS AND PRINTS.

1,136,705.

Specification of Letters Patent.     Patented Apr. 20, 1915.

Application filed August 5, 1914. Serial No. 855,101.

*To all whom it may concern:*

Be it known that I, HERBERT B. NICHOLS, a citizen of the United States, residing at Belle Island, South Norwalk, county of Fairfield, State of Connecticut, have invented certain new and useful Improvements in Washers for Photographic Films and Prints, of which the following is a specification, reference being had to the accompanying drawings, which form a part hereof.

This invention relates to washers for photographic films and prints.

The invention seeks to provide an efficient and inexpensive device adapted to create a whirl of water within a suitable vessel for washing photographic films and prints and thereby removing traces of the acid which may have adhered thereto after their previous treatment.

Referring now to the accompanying drawings forming part of this specification and in which like reference numerals designate corresponding parts in the several figures, and which show the invention in its preferred form, Figure 1 is a side elevation of the washer, the same being shown in its operative relation with reference to a washing pan. Fig. 2 is a side elevation showing the nozzle of the washer. Fig. 3 is an edge view of the nozzle looking toward the left of Fig. 2.

Referring now to the various details as shown in the accompanying drawings, 1 is a pan or other suitable vessel designed to contain a supply of water and within which the films and prints are intended to be washed. The nozzle 2 comprises a tubular portion 3 provided with a plurality of nipples, such as those marked 4, 5 and 6, the latter two of which are preferably directed somewhat downward, as shown in Fig. 2. Removably connecting with the tubular portion 3 is a flexible tube 7 adapted to be removably connected with a water faucet 8.

Rigidly secured to one side of the tubular portion 3 is a holding clip having a fixed jaw 10 and a movable spring jaw 9. This holding clip is designed and adapted to receive and clasp between its jaws one side of the pan 1, as shown in Fig. 1, thereby holding the nozzle in working position and thus dispensing with the necessity of holding the nozzle in place by hand. Rigidly fixed to the opposite side of the tubular portion 3 is a thin plate constituting a shield 11. The rear margin of this shield is curved partly around the tubular portion 3 and is brazed or otherwise united to the adjacent margin of the jaw 10 of the holding clip, as shown at 12 in Figs. 2 and 3. The opposite margin of the shield 11 projects slightly beyond the outer ends of the nipples.

When the washer is in operation, the water jets emitted from the nipples impart a whirling motion to the water contained within the vessel 1. The films and prints immersed in the water are moved about here and there, and generally in a circular direction, owing to the whirling action of the water within the pan and the action of the streams emitted from the nipples, thereby washing off all the acid that may have adhered to them. As the films and prints take up the circular motion of the water in the vessel, they are prevented from catching upon the nozzle by the shield 11, this shield being on that side of the nozzle which faces the body of water within the vessel.

In the preferred form of the nozzle, I make the nipples of increasing length toward the outer end of the nozzle. This arrangement is more effective in producing and maintaining the proper motion of the water in the pan.

While I have shown the invention in its preferred form, it is to be understood that the particular form may be variously modified without departing from the spirit of the invention.

What I claim is:

1. In a washer for photographic films and prints, a nozzle comprising a tubular portion having a plurality of nipples of increasing length toward the outer end of the nozzle, and a holding clip for attaching the nozzle to the wall of a suitable washing vessel and thereby holding the nozzle in working position.

2. In a washer for photographic films and prints, a nozzle comprising a tubular portion having a plurality of nipples and a fixed shield to prevent the films and prints under treatment from catching on the nozzle.

3. In a washer for photographic films and prints, a nozzle comprising a tubular portion provided with means for emitting jets of water, a fixed shield to prevent the films and prints under treatment from catching on the nozzle and a holding clip for attaching the nozzle to the wall of a suitable washing vessel and thereby holding the nozzle in working position.

This specification signed and witnessed this 31st day of July, A. D. 1914.

HERBERT B. NICHOLS.

Witnesses:
J. M. ECKENRODE,
FRANK J. TAYLOR.